(12) United States Patent
You et al.

(10) Patent No.: US 12,598,672 B2
(45) Date of Patent: Apr. 7, 2026

(54) METHOD FOR CELL RESELECTION, TERMINAL DEVICE, AND COMPUTER-READABLE STORAGE MEDIUM

(71) Applicant: GUANGDONG OPPO MOBILE TELECOMMUNICATIONS CORP., LTD., Dongguan (CN)

(72) Inventors: Xin You, Dongguan (CN); Haitao Li, Dongguan (CN); Shukun Wang, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 477 days.

(21) Appl. No.: 17/818,235

(22) Filed: Aug. 8, 2022

(65) Prior Publication Data

US 2022/0386202 A1     Dec. 1, 2022

Related U.S. Application Data

(63) Continuation of application No. PCT/CN2020/075433, filed on Feb. 14, 2020.

(51) Int. Cl.
*H04W 84/06*          (2009.01)

(52) U.S. Cl.
CPC ................................... *H04W 84/06* (2013.01)

(58) Field of Classification Search
CPC .................................................... H04W 84/06
See application file for complete search history.

(56) References Cited

U.S. PATENT DOCUMENTS 6,564,057 B1     5/2003   Chun et al.
2020/0413451 A1*  12/2020  Taherzadeh Boroujeni ................
                                           H04W 56/005
2021/0376915 A1*  12/2021  Mahalingam ......... H04W 16/28
2022/0110035 A1*   4/2022  Liberg ...................... G01S 5/14

FOREIGN PATENT DOCUMENTS

CN     101523950     9/2009
CN     102647767     8/2012
CN     107623911     1/2018
CN     110636560     12/2019
WO     2019137949 A1  7/2019
WO     2019170866     9/2019

(Continued)

OTHER PUBLICATIONS

ZTE Corporation et al., "Consideration on the Cell Definition and NTN Mobility," 3GPP TSG-RAN WG2 Meeting#104, R2-1817062, Nov. 2018.

(Continued)

*Primary Examiner* — Huy D Vu
*Assistant Examiner* — Latha Chakravarthy
(74) *Attorney, Agent, or Firm* — Hodgson Russ LLP

(57)          ABSTRACT

A method for cell reselection, a terminal device, and a computer-readable storage medium are provided in implementations of the disclosure. The method is applicable to a terminal device. The method includes performing cell reselection according to first information, where the first information includes location information of the terminal device.

17 Claims, 6 Drawing Sheets

CANDIDATE CELL 1          CANDIDATE CELL 2          CANDIDATE CELL 3

(56)                 References Cited

FOREIGN PATENT DOCUMENTS

WO          2020165681 A1     8/2020

OTHER PUBLICATIONS

WIPO, International Search Report and Written Opinion for International Application No. PCT/CN2020/075433, Aug. 31, 2020.
Spreadtrum Communications, "Impacts caused by measurement variations in NTN," 3GPP TSG-RAN WG2 Meeting #106, R2-1905688, Reno, NV, US, May 13-17, 2019.
CATT, "Considerations on NTN mobility," 3GPP TSG-RAN WG3 #102, R3-186368, Spokane, WA, US, Nov. 12-16, 2018.
OPPO, "Discussion on cell reselection for NTN," 3GPP TSG-RAN WG2 Meeting #111 electronic, R2-2006783, Aug. 17-28, 2020.
EPO, Extended European Search Report for EP Application No. 20918266.6, Feb. 24, 2023.

* cited by examiner

NETWORK
DEVICE

TERMINAL
DEVICE

PERFORM CELL RESELECTION ACCORDING TO FIRST
INFORMATION, WHERE THE FIRST INFORMATION
INCLUDES LOCATION INFORMATION OF A TERMINAL
DEVICE

201

NETWORK
DEVICE

CANDIDATE
CELL

NETWORK
DEVICE

CANDIDATE
CELL

NETWORK
DEVICE

CANDIDATE
CELL

METHOD FOR CELL RESELECTION, TERMINAL DEVICE, AND COMPUTER-READABLE STORAGE MEDIUM

CROSS-REFERENCE TO RELATED APPLICATION(S)

This application is a continuation of International Application No. PCT/CN2020/075433, filed Feb. 14, 2020, the entire disclosure of which is incorporated herein by reference.

TECHNICAL FIELD

This application relates to the field of communication technology, and specifically to a method for cell reselection, a terminal device, and a computer-readable storage medium.

BACKGROUND

Currently, cell reselection is mainly oriented to a terrestrial network (TN). In the TN, cell reselection is performed mainly based on a reference signal receiving power (RSRP). However, in a non-terrestrial network (NTN), due to a long distance between a satellite and the ground, an RSRP measured by a terminal device at a center of a cell is not very different from that at an edge of the cell. Therefore, in the NTN, accuracy of cell reselection performed based on the RSRP will be affected.

SUMMARY

Implementations of the disclosure provide a method for cell reselection, a terminal device, and a computer-readable storage medium.

In a first aspect, a method for cell reselection is provided in implementations of the disclosure. The method is applicable to a terminal device. The method includes performing cell reselection according to first information, where the first information includes location information of the terminal device.

In a second aspect, a terminal device is provided. The terminal device includes a processor and a memory storing a computer program. The computer program is executed by the processor to cause the processor to perform cell reselection according to first information, where the first information includes location information of the terminal device.

In a third aspect, a computer-readable storage medium is provided in implementations of the disclosure. The storage medium stores a computer program. The computer program is executed by a processor to cause the processor to perform cell reselection according to first information, where the first information includes location information of the terminal device.

BRIEF DESCRIPTION OF THE DRAWINGS

In order to describe more clearly technical solutions of implementations of the disclosure, the following will give a brief introduction to the accompanying drawings used for describing the implementations. Apparently, the accompanying drawings described below are some implementations of the disclosure. Based on these drawings, those of ordinary skill in the art can also obtain other drawings without creative effort.

DETAILED DESCRIPTION

Terms used in the detailed description of the disclosure are merely intended for explaining implementations of the disclosure rather than limiting the disclosure. The terms "first", "second", "third", "fourth", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion.

Figures 1, 2:
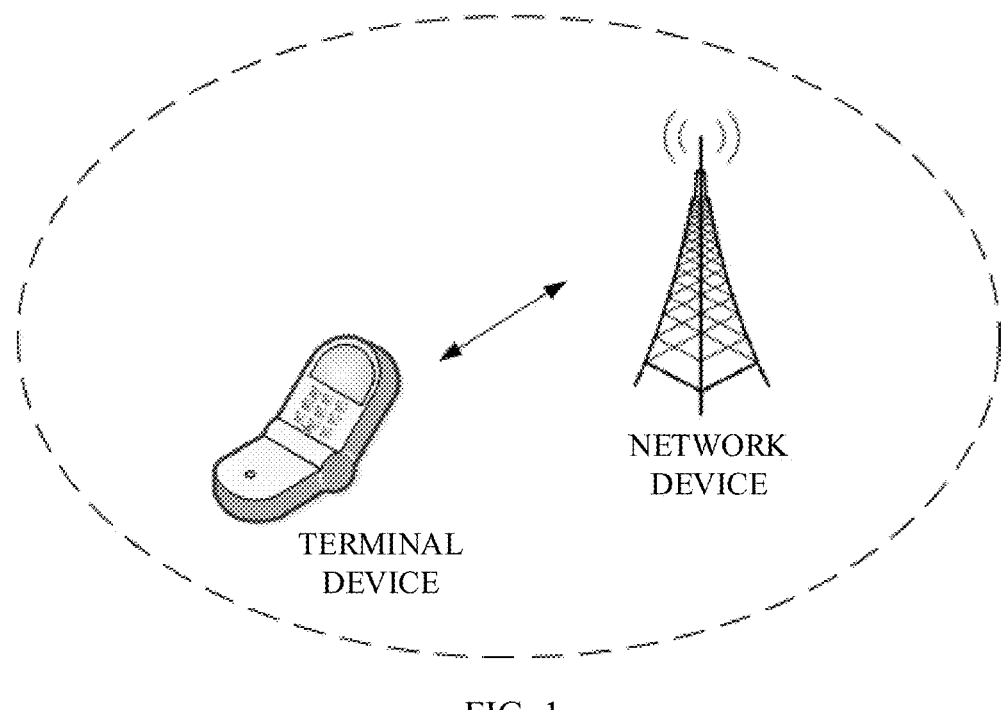
FIG. 1 is a schematic architectural diagram of a communication system provided in implementations of the disclosure.
FIG. 2 is a schematic flow chart of a method for cell reselection provided in implementations of the disclosure.

Refer to FIG. 1, which is a schematic architectural diagram of a communication system provided in implementations of the disclosure. The communication system includes a network device and a terminal device. As illustrated in FIG. 1, the network device can communicate with the terminal device. The communication system may be a global system for mobile communication (GSM), a code division multiple access (CDMA) system, a wideband code division multiple access (WCDMA) system, a worldwide interoperability for microwave access (WiMAX) system, a long term evolution (LTE) system, a 5$^{th}$ generation (5G) communication system (such as new radio (NR)), a communication system that integrates multiple communication technologies (such as communication system that integrates LTE technology and NR technology), or a future evolved communication system. The form and quantity of the network device and the terminal device illustrated in FIG. 1 are merely intended for illustration, and do not constitute limitation on implementations of the disclosure.

The terminal device in the disclosure is a device with wireless communication functions. The terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.). The terminal device can be a mobile phone, a pad, a computer with wireless transceiver functions, a virtual reality (VR) terminal device, an augmented reality (AR) terminal device, a wireless terminal in industrial control, a wireless terminal in self driving, a wireless terminal in remote medicine, a wireless terminal in smart grid, a wireless terminal in smart home, etc. The terminal device may also be a handheld device with wireless communication functions, an in-vehicle device, a wearable device, a computer device, or other processing devices coupled with a wireless modem, etc. Terminal devices in different networks may be called different names, for example, terminal device, access terminal, subscriber unit, subscriber station, mobile station, remote station, remote terminal, mobile device, user terminal, terminal, wireless communication device, user agent or user device, cellular radio telephone, cordless telephone, session initiation protocol (SIP) telephone, wireless local loop (WLL) station, personal digital assistant (PDA), terminal device in a 5G network or in a future evolved network, etc.

The network device in the disclosure is a device that is deployed in a radio access network (RAN) to provide wireless communication functions. For example, the network device may be a RAN device at an access-network side in a cellular network. The RAN device is a device for access of the terminal device to a radio network, which includes but is not limited to: an evolved Node B (eNB), a radio network controller (RNC), a Node B (NB), a base station controller (BSC), a base transceiver station (BTS), a home base station (such as home evolved Node B, or home Node B (HNB)), a base band unit (BBU), and a mobility management entity (MME). For another example, the network device may also be a node device in a wireless local area network (WLAN), such as access controller (AC), gateway, or wireless fidelity (WIFI) access point (AP). For another example, the network device may also be a transmission node or transmission reception point (TRP or TP) in an NR system, etc.

At present, the $3^{rd}$ generation partnership project (3GPP) is studying non-terrestrial network (NTN) technology. NTN generally provides communication services to terrestrial users through satellite communication. Compared with terrestrial cellular network communication, satellite communication has many unique advantages. First, satellite communication is not constrained by areas of users. For example, terrestrial communication is unable to cover areas without communication coverage like sparsely populated areas as well as areas where communication devices cannot be set up, such as oceans, mountains, and deserts. In contrast, for satellite communication, one satellite can cover a large ground and the satellite can orbit the earth. Therefore, in theory, every corner on the earth can be covered for satellite communication. Second, satellite communication has greater social value. Remote mountainous areas and poverty-stricken and underdeveloped countries or regions can be covered for satellite communication at a low cost, so that people in these areas can enjoy advanced voice communication and mobile internet technologies, thereby narrowing a digital gap with developed areas and thus promoting development of these areas. Third, a satellite has a long communication distance, and increase in communication distance will not lead to substantial increase in communication cost. Finally, satellite communication has high stability and is not constrained by natural disasters.

Communication satellites are classified into low-earth orbit (LEO) satellites, medium-earth orbit (MEO) satellites, geostationary earth orbit (GEO) satellites, high elliptical orbit (HEO) satellites, and the like according to different orbital altitudes.

For the LEO satellite, the orbital altitude thereof ranges from 500 km (kilometer) to 1500 km, an orbital period is about 1.5 hours to 2 hours, and a signal propagation delay of single-hop communication between users is generally less than 20 ms (millisecond). A satellite has a maximum visibility time of 20 minutes, a short signal propagation distance, and a less link loss, and does not have high requirements on transmission power for the terminal device.

For the GEO satellite, the orbital altitude thereof is 35786 km, an orbital period is 24 hours, and a signal propagation delay of single-hop communication between users is generally 250 ms.

In order to ensure the coverage of the satellite and increase the system capacity of the entire satellite communication system, the satellite uses multi-beams to cover the ground. One satellite can provide tens of or even hundreds of beams for ground coverage, and one satellite beam can cover a ground area with a diameter of tens to hundreds of kilometers.

Cell reselection is a procedure in which the terminal device in an idle mode monitors a signal quality of a neighbouring cell and a signal quality of a current cell in order to select a best cell to provide service signals. If the signal quality and an electrical level of a neighbouring cell fulfill S-criteria and reselection determination criteria (R-criteria), the terminal device will access and camp on the cell.

After the terminal device camps successfully, the terminal device constantly measures the cell. A radio resource control (RRC) layer calculates Srxlev according to a reference signal received power (RSRP) measurement result, that is, the S-criteria, and compares the calculated Srxlev with Sintrasearch and Snonintrasearch, where the comparison result is used as a determination condition of whether to start neighbouring-cell measurement.

Measurement Configuration

For intra-frequency and inter-frequency, a per frequency synchronization signal and physical broadcast channel block (SSB) measurement time configuration (SMTC) is configured for the terminal device for measurement, thereby achieving power saving of the terminal device.

Cell Signal Quality Determination

1) A system broadcasts a parameter N and threshold per frequency, which are used for best-beam selection; a linear average of signal quality values of the top N beams that satisfy the threshold is a cell signal quality;

2) If no parameter N and threshold per frequency are broadcast, a signal quality of the best beam in a cell is the cell signal quality.

Target Cell Selection (R-Criteria)

Candidate cells are ranked according to rangeToBestCell, that is, from all the candidate cells a difference between a cell signal quality of each of which and the highest cell signal quality falls within the rangeToBestCell, a cell with maximal beams that satisfy the threshold is selected as a target cell.

$$Rs = Qmeas\_s + Qhyst - Qoffset_{temp}$$

$$Rn = Qmeas\_n - Qoffset - Qoffset_{temp}$$

Qmeas represents an RSRP measurement quantity used in cell reselection, Qmeas_s is an RSRP measurement quantity of a current camped cell, and Qmeas_n is an RSRP measurement quantity of a neighbouring cell.

Qoffset represents an offset between the target cell and the current camped cell. For intra-frequency, if $Qoffset_{s,n}$ is valid, $Qoffset = Qoffset_{s,n}$; otherwise Qoffset=0. For inter-frequency, if $Qoffset_{s,n}$ is valid, $Qoffset = Qoffset_{s,n} + Qoffset_{frequency}$; otherwise $Qoffset = Qoffset_{frequency}$.

Qhyst represents a hysteresis value in cell reselection.

Qoffset$_{s,n}$ is an offset between a current cell and a neighbouring cell.

Qoffset$_{frequency}$ represents an offset of a carrier frequency of a measured neighbouring cell.

Qoffset$_{temp}$ represents an offset temporarily applied to a cell.

Frequency Priority

In order for load balance between different frequencies, the network device may set priorities for different frequencies. The terminal device gives priority to camping on a high-priority frequency. Priorities of different frequencies may be obtained from a system broadcast message, or may be obtained from dedicated signaling (such as RRC release signaling), or may be inherited from other radio access technologies (RAT).

Priority Configuration

Both cell reselection priority and sub-priority are used for indicating a final cell reselection frequency priority. The cell reselection priority has values of 0-7, and the sub-priority has values of {0.2, 0.4, 0.6, 0.8}, which indicate 40 frequency priorities in total. The sub-priority is applied only to an NR frequency and an LTE frequency.

Dedicated-priority-configuration release conditions: state transition, public land mobile network (PLMN) selection, and timer expiration trigger dedicated priority configuration.

Priority Handling

1) Broadcast configuration is ignored if there is dedicated configuration;
2) Broadcast configuration is applied if in "camped on any cell" state;
3) The priority is the lowest by default if no priority is configured;
4) Equal frequency priorities between RATs are not supported.

All related parameters for constraint of measurement behavior of the terminal device in an IDLE mode come from a system broadcast message. Hereinafter, suppose that all the related parameters are configured. If these parameters are not configured, there will be no corresponding constraint accordingly.

1) In terms of whether to start intra-frequency measurement, if a serving cell fulfills Srxlev>SIntraSearchP and Squal>SIntraSearchQ, intra-frequency neighbouring cell measurement will not be started; otherwise, intra-frequency neighbouring cell measurement will be started.

SIntraSearchP represents an RSRP determination threshold of whether to perform intra-frequency measurement during cell reselection, i.e., an intra-frequency RSRP measurement starting threshold.

Squal represents a cell selection quality value.

SIntraSearchQ represents an intra-frequency reference signal received quality (RSRQ) measurement starting threshold.

2) For equal-priority or lower-priority inter-frequency measurement, if a serving cell fulfills Srxlev>SnonIntraSearchP and Squal>SnonIntraSearchQ, equal-priority or lower-priority inter-frequency measurement will not be started; otherwise, it will be started.

SnonIntraSearchP represents an RSRP determination threshold of whether to perform inter-frequency measurement during cell reselection, i.e., an inter-frequency RSRP measurement starting threshold.

SIntraSearchQ represents an inter-frequency RSRQ measurement starting threshold.

3) Higher-priority inter-frequency measurement is started unconditionally.

Cell Reselection Behavior is Based on Measurement Results of Neighbouring Cells

1) For cell reselection on an intra-frequency cell and an equal-priority inter-frequency cell, it is necessary to fulfill R-criteria (ranked according to RSRP), i.e., a signal quality of a new cell is higher than that of a current cell and this case lasts for a specified length of time, and the terminal device camps on the current cell for no shorter than is (second).

2) For reselection on a higher-priority cell, it is required that a signal quality of the higher-priority cell is higher than a threshold and this case lasts for a specified length of time, and the terminal device camps on the current cell for no shorter than 1 s.

3) For reselection on a lower-priority cell, it is required that no higher-priority cell and equal-priority cell fulfill the criteria; a signal quality of the current cell is lower than a threshold and a signal quality of the lower-priority cell is higher than a threshold, and this case lasts for a specified length of time; and the terminal device camps on the current cell for no shorter than is.

Refer to FIG. 2, which is a schematic flow chart of a method for cell reselection provided in implementations of the disclosure. The method includes the following operations.

Step 201: a terminal device performs cell reselection according to first information. The first information includes location information of the terminal device.

Optionally, the first information further includes an RSRP or an RSRQ measured by the terminal device.

The RSRP measured by the terminal device includes an RSRP of each of multiple neighbouring cells measured by the terminal device. The RSRQ measured by the terminal device includes an RSRQ of each of the multiple neighbouring cells measured by the terminal device.

Optionally, the method for cell reselection in the disclosure is applicable to an NTN.

The location information of the terminal device is obtained through positioning by a global navigation satellite system (GNSS) or obtained through positioning by RAT.

The location information of the terminal device may be indicated in other manners, such as timing advance (TA), round trip time (RTT), propagation delay, cell identity (ID), beam index, etc.

In an implementation of the disclosure, the terminal device performs cell reselection according to the first information as follows. The terminal device determines multiple candidate cells according to the RSRP or the RSRQ. The terminal device determines a target cell according to the location information of the terminal device, where the multiple candidate cells include the target cell.

The number of target cells may be one or multiple.

Optionally, the terminal device determines the multiple candidate cells according to the RSRP or the RSRQ as follows. The terminal device determines, according to the RSRP or the RSRQ, multiple target neighbouring cells that fulfill S-criteria, where the multiple neighbouring cells include the multiple target neighbouring cells. The terminal device determines, from the multiple target neighbouring cells, the multiple candidate cells that fulfil R-criteria.

For each target neighbouring cell, Srxlev>0, and Srxlev is calculated according to an RSRP or an RSRQ of the target neighbouring cell.

A difference between an RSRP of each candidate cell and an RSRP of the best cell among the multiple target neighbouring cells falls within rangeToBestCell, or a difference between an RSRQ of each candidate cell and an RSRQ of the best cell among the multiple target neighbouring cells falls within rangeToBestCell.

In an implementation of the disclosure, the terminal device determines the target cell according to the location information of the terminal device as follows. The terminal device determines, according to the location information of the terminal device, a first distance between the terminal device and a network device for each candidate cell, to obtain multiple first distances, where the multiple first distances are in one-to-one correspondence with the multiple candidate cells. The terminal device determines the target cell according to the multiple first distances.

The terminal device determines, according to the location information of the terminal device, the first distance between the terminal device and the network device for each candidate cell as follows. The terminal device determines, according to the location information of the terminal device and location information of the network device for each candidate cell, the first distance between the terminal device and the network device for each candidate cell.

In an NTN, the location information of the network device for each candidate cell is obtained according to ephemeris information.

Optionally, the terminal device determines the target cell according to the multiple first distances as follows. The terminal device determines a candidate cell corresponding to a minimum distance among the multiple first distances as the target cell.

Figure 3:
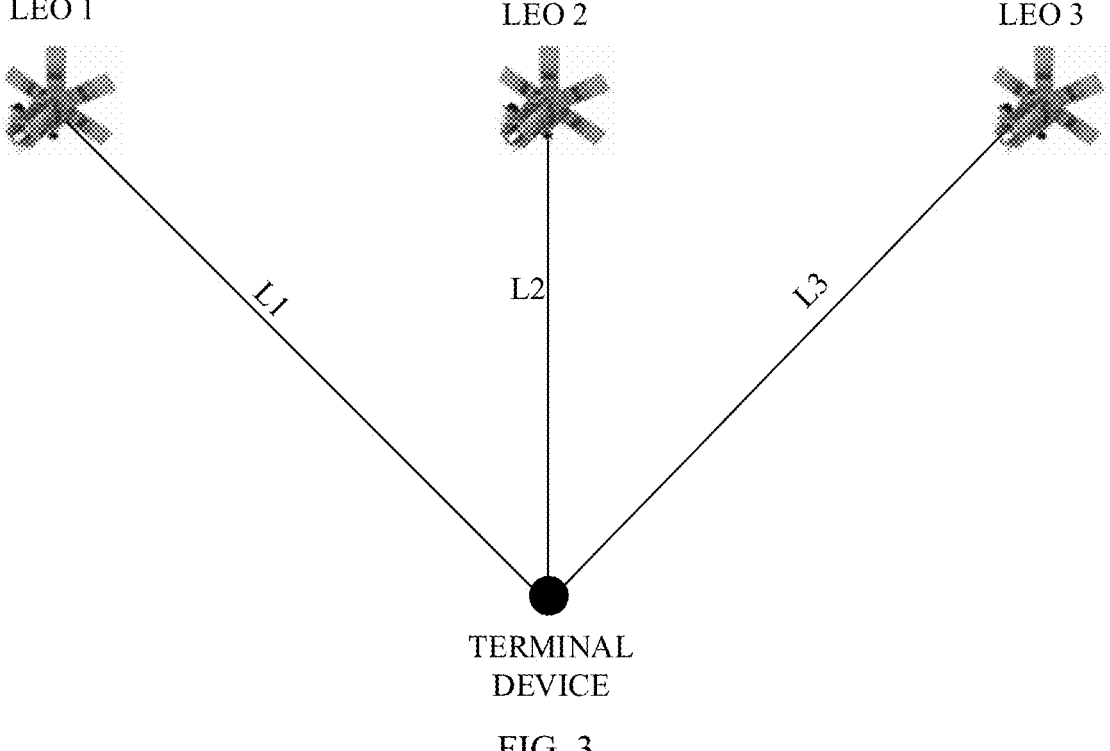
FIG. 3 is a schematic diagram illustrating a distance between a terminal device and a network device for each candidate cell provided in implementations of the disclosure.

For example, as illustrated in FIG. 3, the multiple candidate cells include candidate cell 1, candidate cell 2, and candidate cell 3. A network device for candidate cell 1 is LEO 1, a network device for candidate cell 2 is LEO 2, and a network device for candidate cell 3 is LEO 3. An RSRP of candidate cell 1 is RSRP 1, an RSRP of candidate cell 2 is RSRP 2, and an RSRP of candidate cell 3 is RSRP 3, where RSRP 1>RSRP 2>RSRP 3. Suppose that a distance between the terminal device and LEO 1 is L1, a distance between the terminal device and LEO 2 is L2, and a distance between the terminal device and LEO 3 is L3, where L1>L3>L2, cell 2 is the target cell in cell reselection performed by the terminal device.

Optionally, the terminal device determines the target cell according to the multiple first distances as follows. The terminal device determines a candidate cell corresponding to a target first distance among the multiple first distances as the target cell, where the target first distance is less than or equal to a first threshold value. The first threshold value is specified in a protocol or configured by a network device.

For example, as illustrated in FIG. 3, the multiple candidate cells include candidate cell 1, candidate cell 2, and candidate cell 3. A network device for candidate cell 1 is LEO 1, a network device for candidate cell 2 is LEO 2, and a network device for candidate cell 3 is LEO 3. An RSRP of candidate cell 1 is RSRP 1, an RSRP of candidate cell 2 is RSRP 2, and an RSRP of candidate cell 3 is RSRP 3, where RSRP 1>RSRP 2>RSRP 3. Suppose that a distance between the terminal device and LEO 1 is L1, a distance between the terminal device and LEO 2 is L2, and a distance between the terminal device and LEO 3 is L3, where L1>the first threshold value, L3>the first threshold value, and L2<the first threshold value, cell 2 is the target cell in cell reselection performed by the terminal device.

In an implementation of the disclosure, the terminal device determines the target cell according to the location information of the terminal device as follows. The terminal device determines, according to the location information of the terminal device, a second distance between the terminal device and a reference point of each candidate cell, to obtain multiple second distances, where the multiple second distances are in one-to-one correspondence with the multiple candidate cells. The terminal device determines the target cell according to the multiple second distances.

The terminal device determines, according to the location information of the terminal device, the second distance between the terminal device and the reference point of each candidate cell as follows. The terminal device determines, according to the location information of the terminal device and location information of the reference point of each candidate cell, the second distance between the terminal device and the reference point of each candidate cell.

Optionally, the reference point is broadcast through a first message, or the reference point is a central point of a corresponding candidate cell, or the reference point is a ground station of a corresponding candidate cell.

The first message includes a system message.

Optionally, the terminal device determines the target cell according to the multiple second distances as follows. The terminal device determines a candidate cell corresponding to a minimum distance among the multiple second distances as the target cell.

Figure 4:
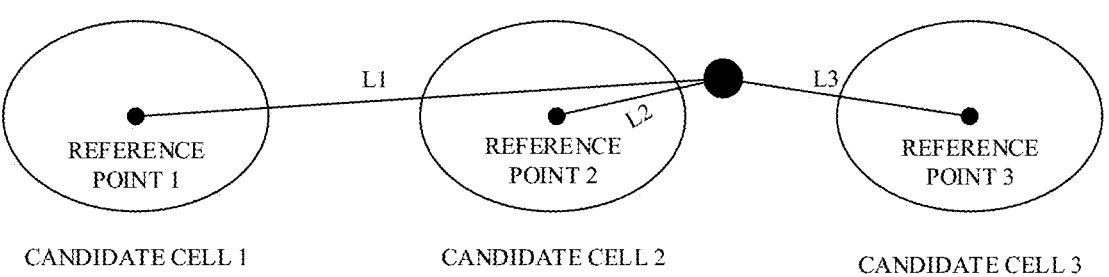
FIG. 4 is a schematic diagram illustrating a distance between a terminal device and a reference point of each candidate cell provided in implementations of the disclosure.

For example, as illustrated in FIG. 4, the multiple candidate cells include candidate cell 1, candidate cell 2, and candidate cell 3. A reference point of candidate cell 1 is reference point 1, a reference point of candidate cell 2 is reference point 2, and a reference point of candidate cell 3 is reference point 3. An RSRP of candidate cell 1 is RSRP 1, an RSRP of candidate cell 2 is RSRP 2, and an RSRP of candidate cell 3 is RSRP 3, where RSRP 1>RSRP 2>RSRP 3. Suppose that a distance between the terminal device and reference point 1 is L1, a distance between the terminal device and reference point 2 is L2, and a distance between the terminal device and reference point 3 is L3, where L1>L3>L2, cell 2 is the target cell in cell reselection performed by the terminal device.

Optionally, the terminal device determines the target cell according to the multiple second distances as follows. The terminal device determines a candidate cell corresponding to a target second distance among the multiple second distances as the target cell, where the target second distance is less than or equal to a second threshold value. The second threshold value is specified in a protocol or configured by a network device.

For example, as illustrated in FIG. 4, the multiple candidate cells include candidate cell 1, candidate cell 2, and candidate cell 3. A reference point of candidate cell 1 is reference point 1, a reference point of candidate cell 2 is reference point 2, and a reference point of candidate cell 3 is reference point 3. An RSRP of candidate cell 1 is RSRP 1, an RSRP of candidate cell 2 is RSRP 2, and an RSRP of candidate cell 3 is RSRP 3, where RSRP 1>RSRP 2>RSRP 3. Suppose that a distance between the terminal device and reference point 1 is L1, a distance between the terminal device and reference point 2 is L2, and a distance between the terminal device and reference point 3 is L3, where L1>the second threshold value, L3>the second threshold value, and L2<the second threshold value, candidate cell 2 is the target cell in cell reselection performed by the terminal device.

In an implementation of the disclosure, the terminal device determines the target cell according to the location information of the terminal device as follows. The terminal device determines, according to the location information of the terminal device, an included angle between the terminal device and a network device for each candidate cell, to obtain multiple included angles, where the multiple included angles are in one-to-one correspondence with the multiple candidate cells. The terminal device determines the target cell according to the multiple included angles and cell-coverage included angles for each of the multiple candidate cells.

Figure 5:
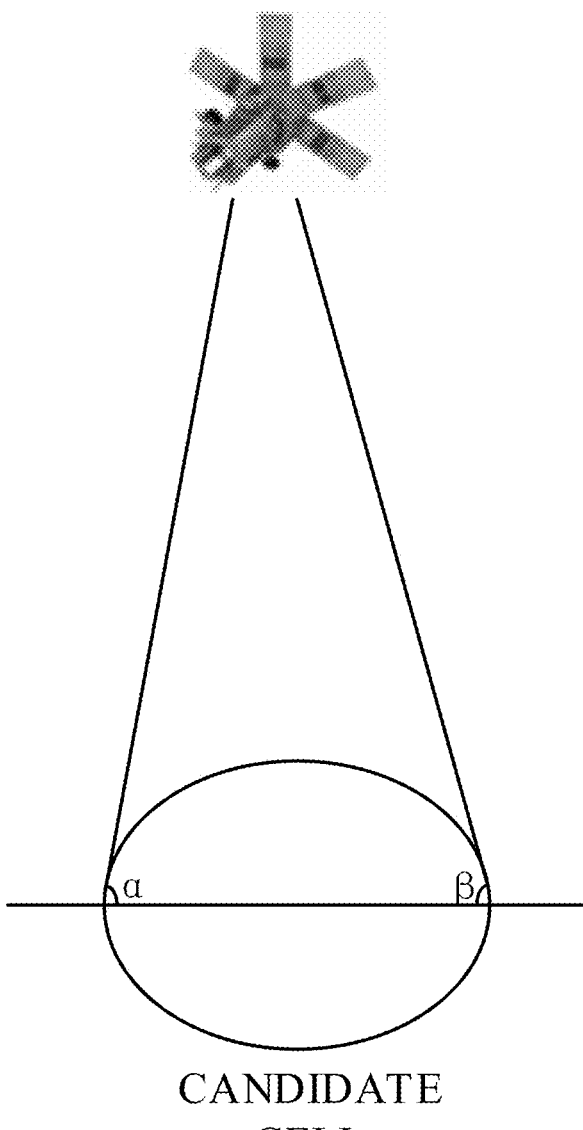
FIG. 5 is a schematic diagram illustrating cell-coverage angles provided in implementations of the disclosure.
Figure 6:
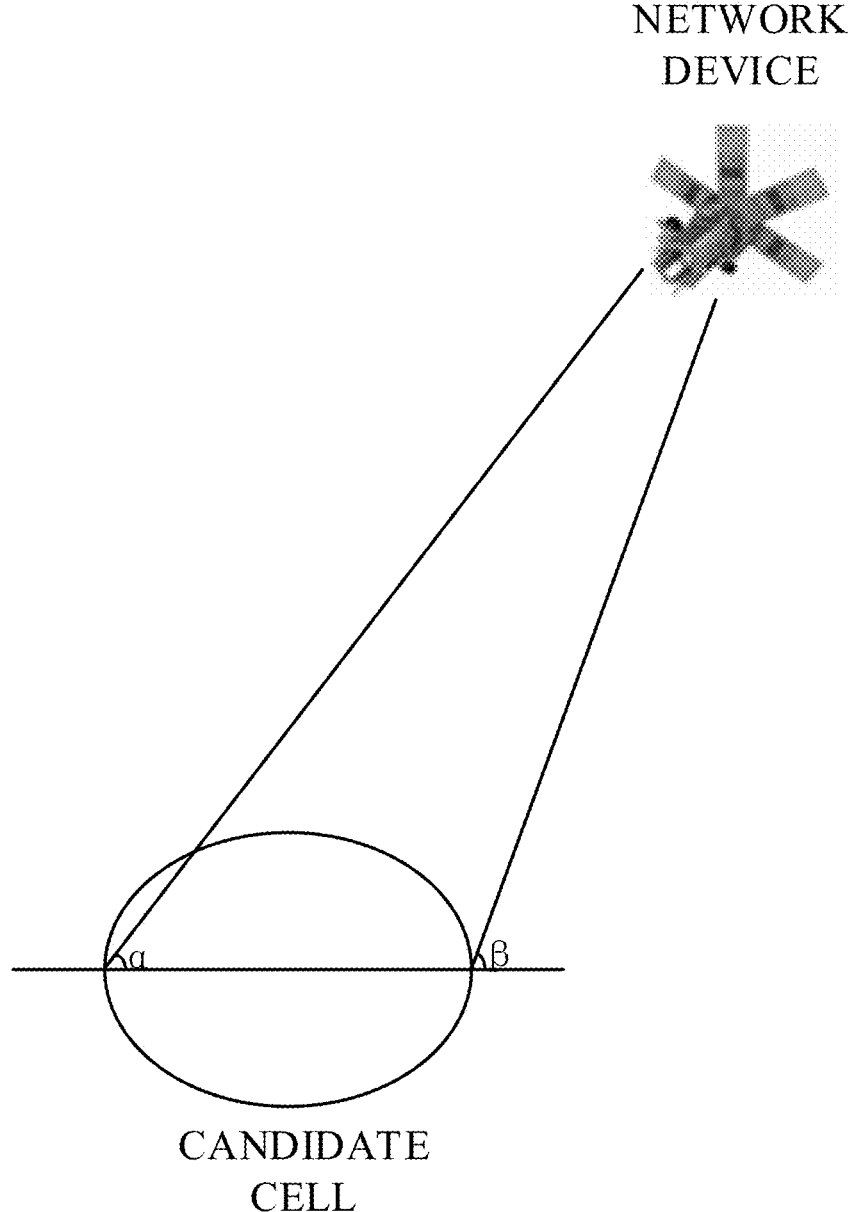
FIG. 6 is another schematic diagram illustrating cell-coverage angles provided in implementations of the disclosure.
Figure 7:
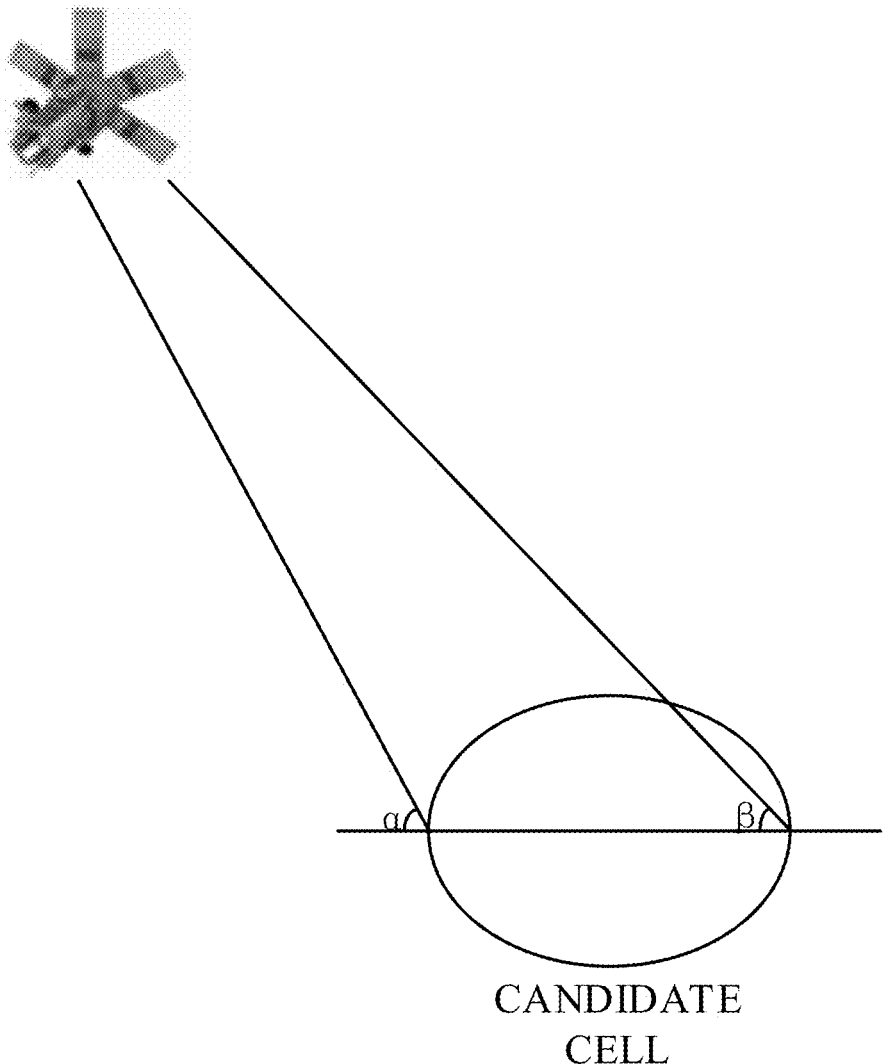
FIG. 7 is another schematic diagram illustrating cell-coverage angles provided in implementations of the disclosure.

Optionally, for each candidate cell, the cell-coverage included angles include a first cell-coverage included angle and a second cell-coverage included angle, the first cell-coverage included angle is an included angle between the network device for the candidate cell and a right edge of the candidate cell (such as a illustrated in FIG. 5~FIG. 7), and the second cell-coverage included angle is an included angle between the network device for the candidate cell and a left edge of the candidate cell (such as R illustrated in FIG. 5~FIG. 7). An included angle between the terminal device and a network device for the target cell is greater than both cell-coverage included angles for the target cell, or the included angle between the terminal device and the network device for the target cell is greater than a first cell-coverage included angle for the target cell and less than a second cell-coverage included angle for the target cell, or the included angle between the terminal device and the network device for the target cell is greater than the second cell-coverage included angle for the target cell and less than the first cell-coverage included angle for the target cell.

The terminal device determines, according to the location information of the terminal device, the included angle between the terminal device and the network device for each candidate cell as follows. The terminal device determines, according to the location information of the terminal device and location information of the network device for each candidate cell, the included angle between the terminal device and the network device for each candidate cell.

Optionally, the cell-coverage included angles are broadcast via a second message. The second message includes a system message.

Optionally, the second message further includes a network-device coverage type.

The network-device coverage type may include, for example, a right-below coverage type (as illustrated in FIG. 5), a bottom-left coverage type (as illustrated in FIG. 6), and a bottom-right coverage type (as illustrated in FIG. 7).

It is to be noted that, network-device coverage types of the multiple candidate cells may be the same or different, which is not limited herein.

If a network-device coverage type of the target cell is the right-below coverage type, the included angle between the terminal device and the network device for the target cell is greater than both the cell-coverage included angles for the target cell.

If the network-device coverage type of the target cell is the bottom-left coverage type, the included angle between the terminal device and the network device for the target cell is greater than the first cell-coverage included angle for the target cell and less than the second cell-coverage included angle for the target cell.

If the network-device coverage type of the target cell is the bottom-right coverage type, the included angle between the terminal device and the network device for the target cell is greater than the second cell-coverage included angle for the target cell and less than the first cell-coverage included angle for the target cell.

In case a network-device coverage type of a current camped cell for the terminal device is the right-below coverage type, if an included angle between the terminal device and a network device for the current camped cell is less than a first cell-coverage included angle for the current camped cell or less than a second cell-coverage included angle for the current camped cell, it is determined that the terminal device is at an edge of the current camped cell or the terminal device has left a coverage range of the current camped cell.

In case the network-device coverage type of the current camped cell for the terminal device is the bottom-left coverage type, if the included angle between the terminal device and the network device for the current camped cell is greater than the second cell-coverage included angle for the current camped cell and less than the first cell-coverage included angle for the current camped cell, it is determined that the terminal device is at the edge of the current camped cell or the terminal device has left the coverage range of the current camped cell.

In case the network-device coverage type of the current camped cell for the terminal device is the bottom-right coverage type, if the included angle between the terminal device and the network device for the current camped cell is greater than the first cell-coverage included angle for the current camped cell and less than the second cell-coverage included angle for the current camped cell, it is determined that the terminal device is at the edge of the current camped cell or the terminal device has left the coverage range of the current camped cell.

Optionally, the second message further includes time information. For an LEO satellite, the LEO is in a moving state and a location of the LEO differs at different time points, and accordingly, cell-coverage included angles for the network device are different at different time points. Therefore, it is necessary to broadcast both the cell-coverage included angles and the time information, such that the terminal device can perform cell reselection according to cell-coverage included angles corresponding to a current time point.

For example, the multiple candidate cells include candidate cell 1, candidate cell 2, and candidate cell 3. A network device for candidate cell 1 is LEO 1, a network device for candidate cell 2 is LEO 2, and a network device for candidate cell 3 is LEO 3. A network-device coverage type of each of candidate cell 1, candidate cell 2, and candidate cell 3 is the right-below coverage type. A first cell-coverage included angle for candidate cell 1 is α1, and a second cell-coverage included angle for candidate cell 1 is β1; a first cell-coverage included angle for candidate cell 2 is α2, and a second cell-coverage included angle for candidate cell 2 is β2; a first cell-coverage included angle for candidate cell 3 is α3, and a second cell-coverage included angle for candidate cell 3 is β3. An included angle between LEO 1 and the terminal device is included angle 1, an included angle between LEO 2 and the terminal device is included angle 2, and an included angle between LEO 3 and the terminal device is included angle 3. Suppose that included angle 1>α1 and included angle 1>β1, included angle 2<α2 or included angle 2<β2, and included angle 3<α3 or included angle 3<β3, candidate cell 1 is the target cell in cell reselection performed by the terminal device.

For another example, the multiple candidate cells include candidate cell 1, candidate cell 2, and candidate cell 3. A network device for candidate cell 1 is LEO 1, a network device for candidate cell 2 is LEO 2, and a network device for candidate cell 3 is LEO 3. A network-device coverage type of candidate cell 1 is the right-below coverage type, a network-device coverage type of candidate cell 2 is the bottom-left coverage type, and a network-device coverage type of candidate cell 3 is the bottom-right coverage type. A first cell-coverage included angle for candidate cell 1 is $\alpha1$, and a second cell-coverage included angle for candidate cell 1 is $\beta1$; a first cell-coverage included angle for candidate cell 2 is $\alpha2$, and a second cell-coverage included angle for candidate cell 2 is $\beta2$; a first cell-coverage included angle for candidate cell 3 is $\alpha3$, and a second cell-coverage included angle for candidate cell 3 is $\beta3$. An included angle between LEO 1 and the terminal device is included angle 1, an included angle between LEO 2 and the terminal device is included angle 2, and an included angle between LEO 3 and the terminal device is included angle 3. Suppose that included angle 1>$\alpha1$ and included angle 1>$\beta1$, $\beta2$<included angle 2<$\alpha2$, $\alpha3$<included angle 3<03, candidate cell 1 is the target cell in cell reselection performed by the terminal device.

As can be seen, in implementations of the disclosure, cell reselection is performed based on the location information of the terminal device. Since whether the terminal device is at a center of a cell or is at an edge of the cell can be determined accurately according to the location information, cell reselection can be performed more accurately based on the location information, thereby ensuring reliability in cell reselection.

Figure 8:
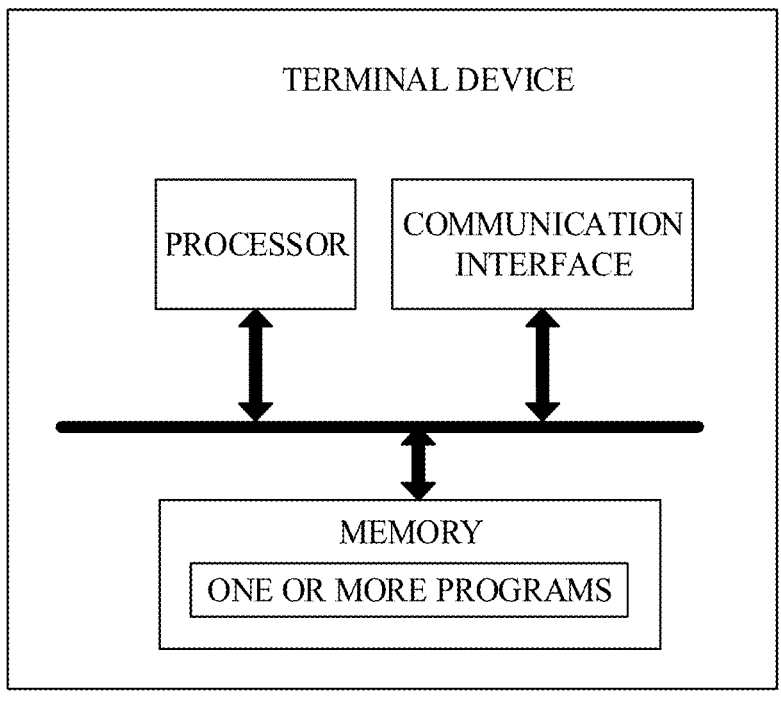
FIG. 8 is a schematic structural diagram of a terminal device provided in implementations of the disclosure.

Refer to FIG. 8, which illustrates a terminal device provided in implementations of the disclosure. The terminal device includes one or more processors, one or more memories, one or more communication interfaces, and one or more programs. The one or more programs are stored in the memory and configured to be executed by the one or more processors. The programs include instructions used for performing cell reselection according to first information, where the first information includes location information of the terminal device.

In an implementation of the disclosure, the first information further includes an RSRP or an RSRQ measured by the terminal device.

In an implementation of the disclosure, in terms of performing cell reselection according to the first information, the programs include instructions specifically used for determining multiple candidate cells according to the RSRP or the RSRQ, and determining a target cell according to the location information of the terminal device, where the multiple candidate cells include the target cell.

In an implementation of the disclosure, in terms of determining the target cell according to the location information of the terminal device, the programs include instructions specifically used for determining a first distance between the terminal device and a network device for each candidate cell according to the location information of the terminal device to obtain multiple first distances, and determining the target cell according to the multiple first distances.

In an implementation of the disclosure, in terms of determining the target cell according to the multiple first distances, the programs include instructions specifically used for determining a candidate cell corresponding to a minimum distance among the multiple first distances as the target cell.

In an implementation of the disclosure, in terms of determining the target cell according to the location information of the terminal device, the programs include instructions specifically used for determining a second distance between the terminal device and a reference point of each candidate cell according to the location information of the terminal device to obtain multiple second distances, and determining the target cell according to the multiple second distances.

In an implementation of the disclosure, in terms of determining the target cell according to the multiple second distances, the programs include instructions specifically used for determining a candidate cell corresponding to a minimum distance among the multiple second distances as the target cell.

In an implementation of the disclosure, the reference point is broadcast through a first message, or the reference point is a central point of a corresponding candidate cell, or the reference point is a ground station of a corresponding candidate cell.

In an implementation of the disclosure, in terms of determining the target cell according to the location information of the terminal device, the programs include instructions specifically used for determining an included angle between the terminal device and a network device for each candidate cell according to the location information of the terminal device to obtain multiple included angles, and determining the target cell according to the multiple included angles and cell-coverage included angles for each of the multiple candidate cells.

In an implementation of the disclosure, for each candidate cell, the cell-coverage included angles include a first cell-coverage included angle and a second cell-coverage included angle, the first cell-coverage included angle is an included angle between the network device for the candidate cell and a right edge of the candidate cell, and the second cell-coverage included angle is an included angle between the network device for the candidate cell and a left edge of the candidate cell. An included angle between the terminal device and a network device for the target cell is greater than both cell-coverage included angles for the target cell, or the included angle between the terminal device and the network device for the target cell is greater than a first cell-coverage included angle for the target cell and less than a second cell-coverage included angle for the target cell, or the included angle between the terminal device and the network device for the target cell is greater than the second cell-coverage included angle for the target cell and less than the first cell-coverage included angle for the target cell.

In an implementation of the disclosure, the cell-coverage included angles are broadcast via a second message.

In an implementation of the disclosure, the second message further includes a network-device coverage type.

In an implementation of the disclosure, the second message further includes time information.

It is to be noted that, for the specific implementation process of these implementations, reference can be made to the specific implementation process of the foregoing method implementations, which will not be elaborated again herein.

Figure 9:
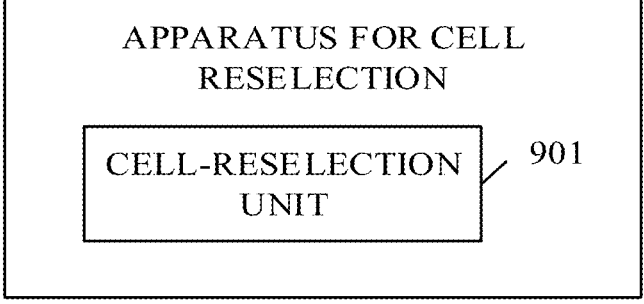
FIG. 9 is a schematic structural diagram of an apparatus for cell reselection provided in implementations of the disclosure.

Refer to FIG. 9, which illustrates an apparatus for cell reselection provided in implementations of the disclosure. The apparatus is applicable to a terminal device. The apparatus includes a cell-reselection unit 901. The cell-reselection unit 901 is configured to perform cell reselection according to first information, where the first information includes location information of the terminal device.

In an implementation of the disclosure, the first information further includes an RSRP or an RSRQ measured by the terminal device.

In an implementation of the disclosure, in terms of performing cell reselection according to the first information, the cell-reselection unit 901 is specifically configured to determine multiple candidate cells according to the RSRP or the RSRQ, and determine a target cell according to the location information of the terminal device, where the multiple candidate cells include the target cell.

In an implementation of the disclosure, in terms of determining the target cell according to the location information of the terminal device, the cell-reselection unit 901 is specifically configured to determine, according to the location information of the terminal device, a first distance between the terminal device and a network device for each candidate cell, to obtain multiple first distances; and determine the target cell according to the multiple first distances.

In an implementation of the disclosure, in terms of determining the target cell according to the multiple first distances, the cell-reselection unit 901 is specifically configured to determine a candidate cell corresponding to a minimum distance among the multiple first distances as the target cell.

In an implementation of the disclosure, in terms of determining the target cell according to the location information of the terminal device, the cell-reselection unit 901 is specifically configured to determine, according to the location information of the terminal device, a second distance between the terminal device and a reference point of each candidate cell, to obtain multiple second distances; and determine the target cell according to the multiple second distances.

In an implementation of the disclosure, in terms of determining the target cell according to the multiple second distances, the cell-reselection unit 901 is specifically configured to determine a candidate cell corresponding to a minimum distance among the multiple second distances as the target cell.

In an implementation of the disclosure, the reference point is broadcast through a first message, or the reference point is a central point of a corresponding candidate cell, or the reference point is a ground station of a corresponding candidate cell.

In an implementation of the disclosure, in terms of determining the target cell according to the location information of the terminal device, the cell-reselection unit 901 is specifically configured to determine, according to the location information of the terminal device, an included angle between the terminal device and a network device for each candidate cell, to obtain multiple included angles; and determine the target cell according to the multiple included angles and cell-coverage included angles for each of the multiple candidate cells.

In an implementation of the disclosure, for each candidate cell, the cell-coverage included angles include a first cell-coverage included angle and a second cell-coverage included angle, the first cell-coverage included angle is an included angle between the network device for the candidate cell and a right edge of the candidate cell, and the second cell-coverage included angle is an included angle between the network device for the candidate cell and a left edge of the candidate cell. An included angle between the terminal device and a network device for the target cell is greater than both cell-coverage included angles for the target cell, or the included angle between the terminal device and the network device for the target cell is greater than a first cell-coverage included angle for the target cell and less than a second cell-coverage included angle for the target cell, or the included angle between the terminal device and the network device for the target cell is greater than the second cell-coverage included angle for the target cell and less than the first cell-coverage included angle for the target cell.

In an implementation of the disclosure, the cell-coverage included angles are broadcast via a second message.

In an implementation of the disclosure, the second message further includes a network-device coverage type.

In an implementation of the disclosure, the second message further includes time information.

It is to be noted that, the cell-reselection unit 901 may be implemented by a processor.

Implementations of the disclosure further provide a computer storage medium. The computer storage medium is configured to store computer programs used for electronic data interchange (EDI) which are operable with a computer to perform any method described in the foregoing method implementations. The computer described above includes a terminal device.

Implementations of the disclosure further provide a computer program product. The computer program product includes computer program instructions. The computer program instructions are operable with a computer to perform any method described in the foregoing method implementations. The computer program product may be a software installation package. The computer described above includes a terminal device.

Implementations of the disclosure further provide a chip. The chip includes computer program instructions. The computer program instructions are operable with a computer to perform any method described in the foregoing method implementations. The computer described above includes a user equipment (UE).

Implementations of the disclosure further provide a computer program. The computer program is operable with a computer to perform any method described in the foregoing method implementations. The computer described above includes a terminal device.

It is to be noted that, for the sake of simplicity, various method implementations above are described as a series of action combinations. However, it will be appreciated by those skilled in the art that the disclosure is not limited by the sequence of actions described. According to the disclosure, some steps may be performed in other orders or simultaneously. In addition, it will be appreciated by those skilled in the art that the implementations described in the specification are preferable implementations, and the actions and modules involved are not necessarily essential to the disclosure.

In the foregoing implementations, the description of each implementation has its own emphasis. For the parts not described in detail in one implementation, reference may be made to related descriptions in other implementations.

It will be appreciated that the apparatuses disclosed in implementations of the disclosure may also be implemented in various other manners. For example, the above apparatus implementations are merely illustrative, e.g., the division of units is only a division of logical functions, and other manners of division may also be available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical or otherwise.

Units illustrated as separated components may or may not be physically separated. Components displayed as units may or may not be physical units, and may reside at one location or may be distributed to multiple networked units. Some or all of the units may be selectively adopted according to practical needs to achieve desired objectives of the solutions of implementations.

In addition, various functional units described in various implementations of the disclosure may be integrated into one processing unit or may be present as a number of physically separated units, and two or more units may be integrated into one. The integrated unit may take the form of hardware or a software functional unit.

If the integrated unit is implemented as software functional units and sold or used as standalone products, it may be stored in a computer-readable memory. Based on such an understanding, the essential technical solutions of the disclosure, or the portion that contributes to the prior art, or all or part of the technical solutions may be embodied as software products. The computer software products can be stored in a memory and may include multiple instructions that, when executed, can cause a computer device, e.g., a personal computer, a server, a network device, etc., to execute some or all operations of the methods described in various implementations of the disclosure. The above memory may include various kinds of media that can store program codes, such as a universal serial bus (USB) flash disk, a read-only memory (ROM), a random access memory (RAM), a mobile hard drive, a magnetic disk, an optical disk, etc.

Those of ordinary skill in the art can understand that all or some operations of various methods in the foregoing implementations can be implemented by instructing related hardware by a program. The program can be stored in a computer-readable memory. The memory can include a flash disk, a ROM, a RAM, a magnetic disk, an optical disk, etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for cell reselection, being applicable to a terminal device and comprising:

performing cell reselection according to first information, the first information comprising location information of the terminal device, and further comprising a reference signal receiving power (RSRP) or a reference signal received quality (RSRQ) measured by the terminal device;

wherein performing cell reselection according to the first information comprises:

determining a plurality of candidate cells according to the RSRP or the RSRQ; and determining a target cell according to the location information of the terminal device, wherein the plurality of candidate cells comprise the target cell;

wherein determining the target cell according to the location information of the terminal device comprises:

determining, according to the location information of the terminal device, an included angle between the terminal device and a network device for each candidate cell, to obtain a plurality of included angles, wherein the plurality of included angles are included angles between a line horizontal to earth at a location of the terminal device and the network device for each candidate cell; and determining the target cell according to the plurality of included angles and cell-coverage included angles for each of the plurality of candidate cells, wherein for each candidate cell, the cell-coverage included angles comprise a first cell-coverage included angle and a second cell-coverage included angle, the first cell-coverage included angle is an included angle between the network device for the candidate cell and a line horizontal to the earth at a right edge of the candidate cell, and the second cell-coverage included angle is an included angle between the network device for the candidate cell and a line horizontal to the earth at a left edge of the candidate cell;

wherein determining the target cell comprises:

in a case where a network-device coverage type of the target cell is a right-below coverage type, an included angle between the terminal device and the network device for the target cell is greater than both a first cell-coverage included angle for the target cell and a second cell-coverage included angle for the target cell;

in a case where the network-device coverage type of the target cell is a bottom-left coverage type, the included angle between the terminal device and the network device for the target cell is greater than the first cell-coverage included angle for the target cell and less than the second cell-coverage included angle for the target cell; and in a case where the network-device coverage type of the target cell is the bottom-right coverage type, the included angle between the terminal device and the network device for the target cell is greater than the second cell-coverage included angle for the target cell and less than the first cell-coverage included angle for the target cell;

wherein the plurality of candidate cells comprise a first candidate cell, a second candidate cell, and a third candidate cell; a network device for the first candidate cell is a first low-earth orbit (LEO) satellite, a network device for the second candidate cell is a second LEO satellite, and a network device for the third candidate cell is a third LEO satellite; a network-device coverage type of the first candidate cell is the right-below coverage type, a network-device coverage type of the second candidate cell is the bottom-left coverage type, and a network-device coverage type of the third candidate cell is the bottom-right coverage type; a first cell-coverage included angle for the first candidate cell 1 is represented as $\alpha 1$, and a second cell-coverage included angle for the first candidate cell is represented as $\beta 1$; a first cell-coverage included angle for the second candidate cell is represented as $\alpha 2$, and a second cell-coverage included angle for the second candidate cell is represented as $\beta 2$; a first cell-coverage included angle for the third candidate cell is represented as $\alpha 3$, and a second cell-coverage included angle for the third candidate cell is represented as $\beta 3$; an included angle between the first LEO satellite and the terminal device is represented as included angle 1, an included angle between the second LEO satellite and the terminal device is represented as included angle 2, and an included angle between the third LEO satellite and the terminal device is represented as included angle 3; wherein in a case where included angle $1>\alpha 1$ and included angle $1>\beta 1$, $\beta 2<$included angle $2<\alpha 2$, $\alpha 3<$included angle $3<\beta 3$, the first candidate cell is determined as the target cell in cell reselection performed by the terminal device.

2. The method of claim 1, wherein:

the reference point is broadcast through a first message; or the reference point is a central point of a corresponding candidate cell; or the reference point is a ground station of a corresponding candidate cell.

3. A terminal device comprising:

a processor; and a memory storing a computer program which, when executed by the processor, causes the terminal device to:

perform cell reselection according to first information, the first information comprising location information of the terminal device, and further comprising a reference signal receiving power (RSRP) or a reference signal received quality (RSRQ) measured by the terminal device;

wherein the computer program executed by the processor to cause the processor to perform cell reselection according to the first information causes the processor to:

determine a plurality of candidate cells according to the RSRP or the RSRQ; and determine a target cell according to the location information of the terminal device, wherein the plurality of candidate cells comprise the target cell;

wherein the computer program executed by the processor to cause the terminal device to determine the target cell according to the location information of the terminal device is executed by the processor to cause the terminal device to:

determine, according to the location information of the terminal device, an included angle between the terminal device and a network device for each candidate cell, to obtain a plurality of included angles, wherein the plurality of included angles are included angles between a line horizontal to earth at a location of the terminal device and the network device for each candidate cell; and determine the target cell according to the plurality of included angles and cell-coverage included angles for each of the plurality of candidate cells, wherein for each candidate cell, the cell-coverage included angles comprise a first cell-coverage included angle and a second cell-coverage included angle, the first cell-coverage included angle is an included angle between the network device for the candidate cell and a line horizontal to the earth at a right edge of the candidate cell, and the second cell-coverage included angle is an included angle between the network device for the candidate cell and a line horizontal to the earth at a left edge of the candidate cell;

wherein determining the target cell comprises:

in a case where a network-device coverage type of the target cell is a right-below coverage type, an included angle between the terminal device and the network device for the target cell is greater than both a first cell-coverage included angle for the target cell and a second cell-coverage included angle for the target cell;

in a case where the network-device coverage type of the target cell is a bottom-left coverage type, the included angle between the terminal device and the network device for the target cell is greater than the first cell-coverage included angle for the target cell and less than the second cell-coverage included angle for the target cell; and in a case where the network-device coverage type of the target cell is the bottom-right coverage type, the included angle between the terminal device and the network device for the target cell is greater than the second cell-coverage included angle for the target cell and less than the first cell-coverage included angle for the target cell;

wherein the plurality of candidate cells comprise a first candidate cell, a second candidate cell, and a third candidate cell; a network device for the first candidate cell is a first low-earth orbit (LEO) satellite, a network device for the second candidate cell is a second LEO satellite, and a network device for the third candidate cell is a third LEO satellite; a network-device coverage type of the first candidate cell is the right-below coverage type, a network-device coverage type of the second candidate cell is the bottom-left coverage type, and a network-device coverage type of the third candidate cell is the bottom-right coverage type; a first cell-coverage included angle for the first candidate cell 1 is represented as $\alpha 1$, and a second cell-coverage included angle for the first candidate cell is represented as $\beta 1$; a first cell-coverage included angle for the second candidate cell is represented as $\alpha 2$, and a second cell-coverage included angle for the second candidate cell is represented as $\beta 2$; a first cell-coverage included angle for the third candidate cell is represented as $\alpha 3$, and a second cell-coverage included angle for the third candidate cell is represented as $\beta 3$; an included angle between the first LEO satellite and the terminal device is represented as included angle 1, an included angle between the second LEO satellite and the terminal device is represented as included angle 2, and an included angle between the third LEO satellite and the terminal device is represented as included angle 3; wherein in a case where included angle $1>\alpha 1$ and included angle $1>\beta 1$, $\beta 2<$included angle $2<\alpha 2$, $\alpha 3<$included angle $3<\beta 3$, the first candidate cell is determined as the target cell in cell reselection performed by the terminal device.

4. The terminal device of claim 3, wherein:

the reference point is broadcast through a first message; or the reference point is a central point of a corresponding candidate cell; or the reference point is a ground station of a corresponding candidate cell.

5. A non-transitory computer-readable storage medium storing a computer program, the computer program being executed by a processor of a terminal device to cause the terminal device to perform following:

performing cell reselection according to first information, the first information comprising location information of a terminal device, and further comprising a reference signal receiving power (RSRP) or a reference signal received quality (RSRQ) measured by the terminal device;

wherein performing cell reselection according to the first information comprises:

determining a plurality of candidate cells according to the RSRP or the RSRQ; and determining a target cell according to the location information of the terminal device, wherein the plurality of candidate cells comprise the target cell;

wherein determining the target cell according to the location information of the terminal device comprises:

determining, according to the location information of the terminal device, an included angle between the terminal device and a network device for each candidate cell, to obtain a plurality of included angles, wherein the plurality of included angles are included angles between a line horizontal to earth at a location of the terminal device and the network device for each candidate cell; and determining the target cell according to the plurality of included angles and cell-coverage included angles for each of the plurality of candidate cells, wherein for each candidate cell, the cell-coverage included angles comprise a first cell-coverage included angle and a second cell-coverage included angle, the first cell-coverage included angle is an included angle between the network device for the candidate cell and a line horizontal to the earth at a right edge of the candidate cell, and the second cell-coverage included angle is an included angle between the network device for the candidate cell and a line horizontal to the earth at a left edge of the candidate cell;

wherein determining the target cell comprises:

in a case where a network-device coverage type of the target cell is a right-below coverage type, an included angle between the terminal device and the network device for the target cell is greater than both a first cell-coverage included angle for the target cell and a second cell-coverage included angle for the target cell;

in a case where the network-device coverage type of the target cell is a bottom-left coverage type, the included angle between the terminal device and the network device for the target cell is greater than the first cell-coverage included angle for the target cell and less than the second cell-coverage included angle for the target cell; and in a case where the network-device coverage type of the target cell is the bottom-right coverage type, the included angle between the terminal device and the network device for the target cell is greater than the second cell-coverage included angle for the target cell and less than the first cell-coverage included angle for the target cell;

wherein the plurality of candidate cells comprise a first candidate cell, a second candidate cell, and a third candidate cell; a network device for the first candidate cell is a first low-earth orbit (LEO) satellite, a network device for the second candidate cell is a second LEO satellite, and a network device for the third candidate cell is a third LEO satellite; a network-device coverage type of the first candidate cell is the right-below coverage type, a network-device coverage type of the second candidate cell is the bottom-left coverage type, and a network-device coverage type of the third candidate cell is the bottom-right coverage type; a first cell-coverage included angle for the first candidate cell 1 is represented as $\alpha 1$, and a second cell-coverage included angle for the first candidate cell is represented as $\beta 1$; a first cell-coverage included angle for the second candidate cell is represented as $\alpha 2$, and a second cell-coverage included angle for the second candidate cell is represented as $\beta 2$; a first cell-coverage included angle for the third candidate cell is represented as $\alpha 3$, and a second cell-coverage included angle for the third candidate cell is represented as $\beta 3$; an included angle between the first LEO satellite and the terminal device is represented as included angle 1, an included angle between the second LEO satellite and the terminal device is represented as included angle 2, and an included angle between the third LEO satellite and the terminal device is represented as included angle 3; wherein in a case where included angle 1>$\alpha 1$ and included angle 1>$\beta 1$, $\beta 2$<included angle 2<$\alpha 2$, $\alpha 3$<included angle 3<$\beta 3$, the first candidate cell is determined as the target cell in cell reselection performed by the terminal device.

6. The method of claim 1, wherein the cell-coverage included angles are broadcast via a second message.

7. The method of claim 6, wherein the second message further comprises a network-device coverage type.

8. The method of claim 6, wherein second message further comprises time information.

9. The terminal device of claim 3, wherein the cell-coverage included angles are broadcast via a second message.

10. The terminal device of claim 9, wherein the second message further comprises a network-device coverage type.

11. The terminal device of claim 9, wherein second message further comprises time information.

12. The non-transitory computer-readable storage medium of claim 5, wherein the cell-coverage included angles are broadcast via a second message.

13. The non-transitory computer-readable storage medium of claim 12, wherein the second message further comprises a network-device coverage type.

14. The non-transitory computer-readable storage medium of claim 12, wherein second message further comprises time information.

15. The method of claim 1, wherein a condition for performing cell reselection comprises:

a network-device coverage type of a current camped cell for the terminal device is a right-below coverage type; in a case where an included angle between the terminal device and a network device for the current camped cell is less than a first cell-coverage included angle for the current camped cell or less than a second cell-coverage included angle for the current camped cell, it is determined that the terminal device is at an edge of the current camped cell or the terminal device has left a coverage range of the current camped cell;

wherein the network-device coverage type of the current camped cell for the terminal device is a bottom-left coverage type; in a case where the included angle between the terminal device and the network device for the current camped cell is greater than the second cell-coverage included angle for the current camped cell and less than the first cell-coverage included angle for the current camped cell, it is determined that the terminal device is at the edge of the current camped cell or the terminal device has left the coverage range of the current camped cell; and wherein the network-device coverage type of the current camped cell for the terminal device is a bottom-right coverage type; in a case where the included angle between the terminal device and the network device for the current camped cell is greater than the first cell-coverage included angle for the current camped cell and less than the second cell-coverage included angle for the current camped cell, it is determined that the terminal device is at the edge of the current camped cell or the terminal device has left the coverage range of the current camped cell;

wherein the included angle between the terminal device and the network device for the current camped cell is an included angle between the line horizontal to the earth at the location of the terminal device and the network device for the current camped cell, the first cell-coverage included angle for the current camped cell is an included angle between the network device for the current camped cell and a line horizontal to the earth at a right edge of the current camped cell, and the second cell-coverage included angle is an included angle between the network device for the current camped cell and a line horizontal to the earth at a left edge of the current camped cell.

16. The terminal device of claim 3, wherein a condition for performing cell reselection comprises:

a network-device coverage type of a current camped cell for the terminal device is a right-below coverage type; in a case where an included angle between the terminal device and a network device for the current camped cell is less than a first cell-coverage included angle for the current camped cell or less than a second cell-coverage included angle for the current camped cell, it is determined that the terminal device is at an edge of the current camped cell or the terminal device has left a coverage range of the current camped cell;

wherein the network-device coverage type of the current camped cell for the terminal device is a bottom-left coverage type; in a case where the included angle between the terminal device and the network device for the current camped cell is greater than the second cell-coverage included angle for the current camped cell and less than the first cell-coverage included angle for the current camped cell, it is determined that the terminal device is at the edge of the current camped cell or the terminal device has left the coverage range of the current camped cell; and wherein the network-device coverage type of the current camped cell for the terminal device is a bottom-right coverage type; in a case where the included angle between the terminal device and the network device for the current camped cell is greater than the first cell-coverage included angle for the current camped cell and less than the second cell-coverage included angle for the current camped cell, it is determined that the terminal device is at the edge of the current camped cell or the terminal device has left the coverage range of the current camped cell;

wherein the included angle between the terminal device and the network device for the current camped cell is an included angle between the line horizontal to the earth at the location of the terminal device and the network device for the current camped cell, the first cell-coverage included angle for the current camped cell is an included angle between the network device for the current camped cell and a line horizontal to the earth at a right edge of the current camped cell, and the second cell-coverage included angle is an included angle between the network device for the current camped cell and a line horizontal to the earth at a left edge of the current camped cell.

17. The non-transitory computer-readable storage medium of claim 5, wherein a condition for performing cell reselection comprises:

a network-device coverage type of a current camped cell for the terminal device is a right-below coverage type; in a case where an included angle between the terminal device and a network device for the current camped cell is less than a first cell-coverage included angle for the current camped cell or less than a second cell-coverage included angle for the current camped cell, it is determined that the terminal device is at an edge of the current camped cell or the terminal device has left a coverage range of the current camped cell;

wherein the network-device coverage type of the current camped cell for the terminal device is a bottom-left coverage type; in a case where the included angle between the terminal device and the network device for the current camped cell is greater than the second cell-coverage included angle for the current camped cell and less than the first cell-coverage included angle for the current camped cell, it is determined that the terminal device is at the edge of the current camped cell or the terminal device has left the coverage range of the current camped cell; and wherein the network-device coverage type of the current camped cell for the terminal device is a bottom-right coverage type; in a case where the included angle between the terminal device and the network device for the current camped cell is greater than the first cell-coverage included angle for the current camped cell and less than the second cell-coverage included angle for the current camped cell, it is determined that the terminal device is at the edge of the current camped cell or the terminal device has left the coverage range of the current camped cell;

wherein the included angle between the terminal device and the network device for the current camped cell is an included angle between the line horizontal to the earth at the location of the terminal device and the network device for the current camped cell, the first cell-coverage included angle for the current camped cell is an included angle between the network device for the current camped cell and a line horizontal to the earth at a right edge of the current camped cell, and the second cell-coverage included angle is an included angle between the network device for the current camped cell and a line horizontal to the earth at a left edge of the current camped cell.

* * * * *